United States Patent [19]

Georgiou et al.

[11] Patent Number: 4,725,141
[45] Date of Patent: Feb. 16, 1988

[54] INTERFEROMETERS

[75] Inventors: George A. Georgiou, London; Anthony C. Boucouvalas, Middlesex, both of England

[73] Assignee: The General Electric Company, p.l.c., England

[21] Appl. No.: 761,142

[22] Filed: Aug. 1, 1985

[30] Foreign Application Priority Data

Aug. 22, 1984 [GB] United Kingdom ................ 8421311
May 22, 1985 [GB] United Kingdom ................ 8512962

[51] Int. Cl.$^4$ .................................................. G01B 9/02
[52] U.S. Cl. ..................................... 356/345; 250/227
[58] Field of Search ........................ 356/345; 250/227; 350/347 R, 347 V, 347 E, 356

[56] References Cited

U.S. PATENT DOCUMENTS 4,291,940  9/1981  Kawasaki et al. ................ 350/96.15
4,376,247  3/1983  Humphrey ............................ 250/227
4,376,248  3/1983  Giallorenzi et al. ................ 250/227
4,524,322  6/1985  Bobb ................................ 350/356 X

OTHER PUBLICATIONS

Barnoski et al., "Fabrication of an Access Coupler with Single-strand Multimode Fiber Waveguides", *Applied Optics*, vol. 15, No. 11, pp. 2629-2630, 11/76.
Sheem et al., "Wavelength Monitoring of Single-mode Diode Laser Using Guided-wave Interferometer", *Optics Letters*, vol. 5, No. 5, pp. 179-181, 5/80.
Giallorenzi et al., "Optical Fiber Sensor Technology", *IEEE J. Quant. Elec.*, vol. QE-18, No. 4, p. 652, 4/82.
Kawasaki et al., (OL), "Biconical-taper Single-mode Fiber Coupler", *Optics Letters*, vol. 6, No. 7, pp. 327-328, 7/81.

*Primary Examiner*—Davis L. Willis
*Assistant Examiner*—Matthew W. Koren
*Attorney, Agent, or Firm*—Kirschstein, Kirschstein, Ottinger & Israel

[57] ABSTRACT

A Mach Zehnder interferometer with arms of equal length is formed between two optic fibres. This is achieved by locating the lightly tensioned fibres in a generally parallel configuration and forming optical couplings between them at points which lie on the center-line of the configuration. Preferably the couplings are formed by a fused biconical tapering technique.

1 Claim, 6 Drawing Figures

INTERFEROMETERS

BACKGROUND OF THE INVENTION

1. Field of the Invention

This invention relates to interferometers and more particularly to Mach Zehnder interferometers which are one of the fundamental components in sensor systems.

2. Description of Related Art

Conventional Mach Zehnder interferometers use beam splitters and mirrors although two optical fibre directional couplers with their two arms spliced together have been used. However, the two arms are subjected to different stress distributions causing a random phase imbalance between them, thus requiring complicated techniques to balance them. More stable Mach Zehnder interferometers can be fabricated in integrated optical components but there is still a requirement for all-fibre interferometers since these are easier to interface with transmission lines.

SUMMARY OF THE INVENTION

Thus, it is an object of the present invention to provide an all-fibre Mach Zehnder interferometer of improved stability.

According to one aspect of the invention a Mach Zehnder interferometer comprises first and second optic fibres which intersect one another at first and second optical couplings such that the section of said first optic fibre between said optical couplings is substantially equal in length to the section of said second optical fibre between said couplings, means for injecting an optical signal through said first optic fibre so that said signal is split between said sections at said first optical coupling and recombined at said second optical coupling, and transducer means for altering the relative effective optical path lengths in said sections. Thus the sections of the respective fibres between the optical couplings constitute the arms of the interferometer.

By ensuring that the arms are of equal length, (e.g. within 0.5 mm or so) the effects of temperature changes are minimised, since both arms are affected equally. For the same reason, the arms of the interferometer are preferably located closely adjacent one another—e.g. within 10 mm (preferably within 5 mm) of each other, and they are preferably less than 100 mm (desirably less than 25 mm) in length.

Preferably said optical couplings are formed by a fused biconical tapering technique.

In order to minimise the effects of vibration, said sections are preferably held rigidly in position by locating means such as, for example, a bond to a supporting plate or a fused joint between the optic fibre sections.

According to another aspect of the invention a method of making a Mach Zehnder interferometer includes the steps of locating two lightly-tensioned optic fibres in a generally parallel configuration, crossing said optic fibres at a point on the centre-line between said optic fibres and forming an optical coupling between them at that point by a fused biconical tapering technique, and crossing said optic fibres at a further point on the centre-line between said optic fibres and forming a further optical coupling between them at said further point by a fused biconical tapering technique thereby to form two arms of said interferometer between said optical couplings, said arms being of substantially equal length.

Fused biconical tapering techniques to form directional couplers are well known from for example U.S. Pat. No. 4,291,940, GB No. 2,112,165A or GB No. 2,136,958A and will thus not be described in detail here.

The interferometer must be formed so that it is possible to apply an external influence on predominantly one arm and this is preferably achieved by providing a resistive metal layer on one of the arms. This can then be heated by an electric current so as to alter the refractive index of the arm. Alternatively, the refractive index may be controlled by acoustic modulation (using a piezoelectric element) or by surrounding a pretapered arm with liquid crystal, which alters the effective refractive index of the arm. In general either a change in length or a change in refractive index will alter the effective optical path length in the arm.

BRIEF DESCRIPTION OF THE DRAWINGS

The invention will now be more fully described by way of example with reference to the drawings in which.

DETAILED DESCRIPTION OF THE PREFERRED EMBODIMENTS

Figure 1:
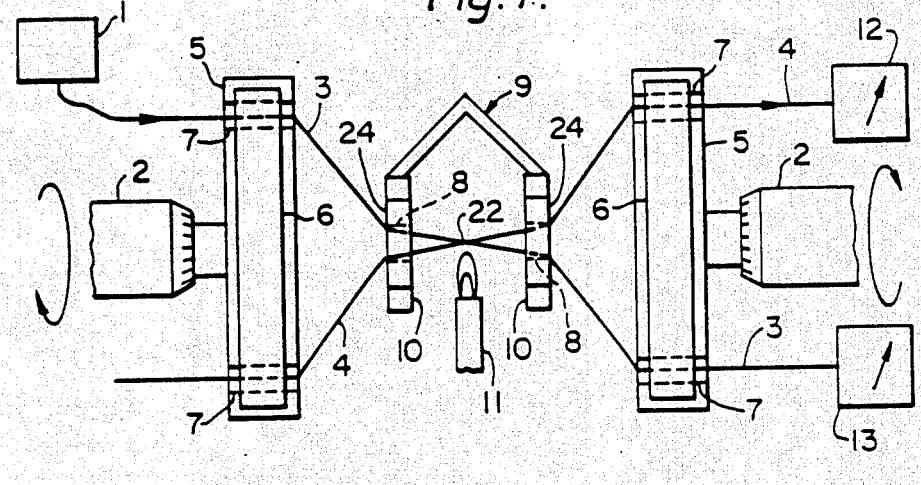
FIG. 1 is a schematic plan view showing a method in accordance with the invention of making a Mach Zehnder interferometer.

Referring to FIG. 1, the apparatus shown comprises two similar parallel support bars 5 which are mounted on a common slide mounting (not shown) and can be driven together or apart by micrometer screw drives 2. Each support bar 5 is provided with two V-grooves 7 at its ends and two lightly tensioned optic fibres 3, 4 are held in these grooves by plastic-coated magnetic clamps 6 in a generally parallel coplanar configuration. The fibres 3, 4 are crossed over a point 22 which is mid-way between their parallel sections and are held in a bridge 9 which incorporates centrally located V-grooves 8 in its respective arms 10. The fibres 3, 4 are held in these V-grooves by plastic coated magnetic clamps 24 and thus the sections of the fibres adjacent their crossing point 22 are almost coaligned. It is assumed that the plastic outer coating has been removed from at least these sections of the fibres.

An optical coupling is formed at point 22 by a fused biconical tapering technique, which involves fusing the claddings of the fibres 3 and 4 with a microtorch 11 while pulling the fibres by means of the micrometer drives 2 at a rate of approximately 300 $\mu$m/s to elongate the fused joint. The splitting ratio of the coupling being formed is monitored by injecting light from a light source 1 into fibre 3 and comparing the output optical intensities from fibres 3 and 4 by means of photodetectors 12 and 13. The drives are stopped when the splitting ratio reaches 50%.

Figures 2A, 2B:
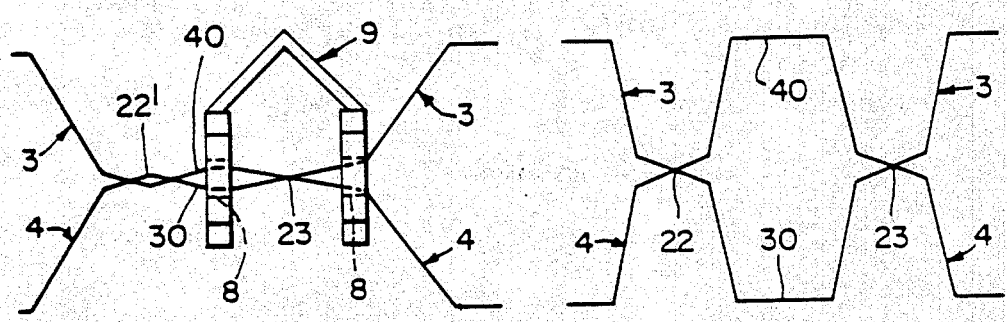
FIG. 2(a) shows schematically a subsequent step in the method of FIG. 1.
FIG. 2(b) shows schematically a symmetrical optic fibre configuration for use in another method in accordance with the invention.

The next stage in the process is illustrated in FIG. 2(a), where most of the apparatus shown in FIG. 1 is omitted for the sake of clarity. The optical coupling formed at point 22 is indicated at 22'. Fibres 3 and 4 are re-crosses at a point 23 and the bridge 9 is shifted to hold the fibres in alignment at this point, which, like point 22, is mid-way between the parallel sections of the fibres. A further optical coupling is then formed at point 23 by a fused biconical tapering technique which is similar to that described above with reference to FIG. 1. However in this case the desired 50% splitting ratio at the new coupling is achieved by elongating the fused joint at 23 until substantially 100% of the optical intensity injected into fibre 3 and split at coupling 22 is transferred to fibre 4 at the new coupling. This condition corresponds to a 50% splitting ratio because of $\pi/2$ phase changes which occur at the couplings. Because of the symmetry of the optical fibre configuration, the sections 30 and 40 of fibres 3 and 4 between the optical couplings are of precisely equal length. These sections, which form the arms of the finished interferometer, are therefore affected equally by changes in the environment of the interferometer.

FIG. 2(b) shows another parallel configuration of optic fibres 3 and 4 in which the sections 30 and 40 between the crossing points 22 and 23 (at which the optical couplings are formed, either successively or simultaneously) are of equal length (typically between 10 and 25 mm). The clamps required to maintain the optic fibre configuration of FIG. 2(b) are omitted for the sake of clarity.

Figure 3:
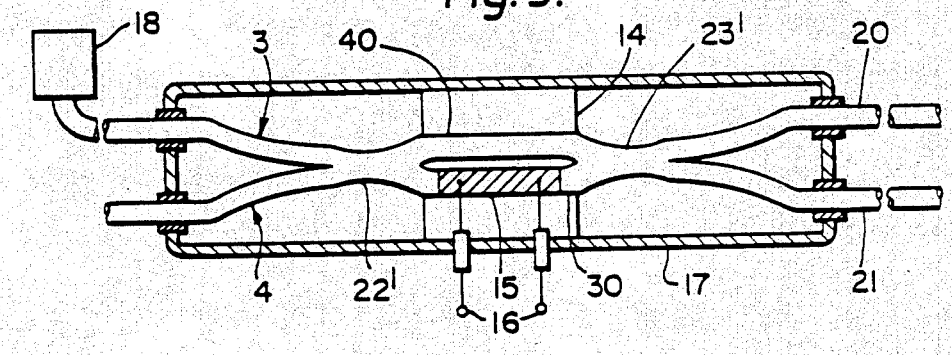
FIG. 3 shows a Mach Zehnder interferometer in accordance with the invention.

FIG. 3 shows a finished Mach Zehnder interferometer made by the method of FIGS. 1 and 2(a) or 1 or 2(b). The interferometer is housed in a protective aluminium box 17 to shield it from evironmental temperature gradients and the arms 30,40 are bonded to a rigid support plate 14. The interferometer assembly is then potted in a conventional silicone resin (not shown). A resistive metal layer 15, deposited on one of the arms by a conventional technique, can be heated by the passage of current through supply leads 16. A light source 18 injects an optical signal into fibre 3 and this signal is split at coupling 22' and recombined at coupling 23'. An A.C. signal applied to leads 16 modulates the phase difference between the interfering optical signal components at coupling 23' and the resulting optical signal can be monitored (by means not shown) at either of the output fibre ends 20 and 21. It will be apparent that any transducer which is capable of modulating the length and/or the refractive index of one of the interferometer arms 30 and 40 will affect the effective optical path length of that arm and thereby modulate the interference between the recombining optical signal components at coupling 23'. Thus heater 15 could be replaced by a piezoelectric element for example.

Figure 4:
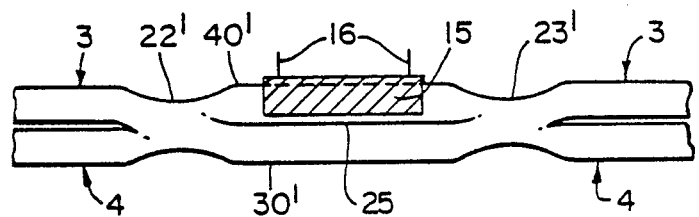
FIG. 4 shows another Mach Zehnder interferometer in accordance with the invention.

FIG. 4 shows another Mach Zehnder interferometer produced by a fused biconical tapering technique. However the optical couplings 22' and 23' are formed with the optic fibres 3,4 crossing over at a very small angle, so that the intermediate sections 30' and 40' are closely adjacent each other. These sections are then barely fused together to form a joint 25. Joint 25 has a figure-of-eight cross-section, so there is very little interference at sections 30' and 40' between optical signal components propagating along the fibres. However the joint 25 is sufficient to secure the fibres against vibration. A heater 15 is used to control the phase difference between optical signal components in the arms of the interferometer as in the interferometer of FIG. 3.

Figure 5:
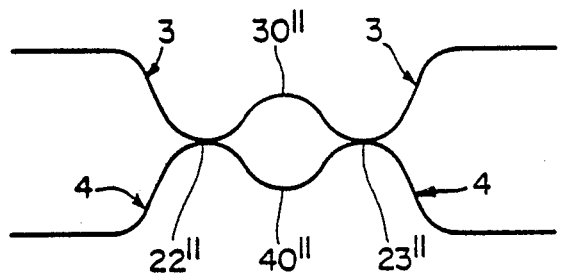
FIG. 5 shows a generally parallel configuration of optic fibres which can be formed into a Mach Zehnder interferometer by a further method in accordance with the invention.

FIG. 5 shows two optic fibres 3 and 4 in a generally parallel configuration in which they meet, but do not cross, at points 22" and 23" which are both mid-way between the parallel sections of the fibres. Due to the symmetry of the arrangement, the intermediate sections 30" and 40" of the fibres 3,4 are of equal length. Thus fused optical couplings may be formed at points 22" and 23" and the resulting assembly may be used as the major component in an interferometer in accordance with the invention. The sections 30" and 40" (which ultimately constitute the arms of the finished interferometer) may be barely fused together or may be rigidly supported by some other means.

We claim:
1. A method of making a Mach Zehnder interferometer comprising the steps of:
   (a) providing two lightly tensioned optic fibres in a generally parallel configuration,
   (b) crossing said optic fibres at a point on the center-line between said optic fibres and forming an optical coupling between said optic fibres at said point by a fused biconical tapering technique,
   (c) crossing said optic fibres at a further point on the centre-line between said optic fibres and forming a further optical coupling between said optic fibres at said further point by a fused biconical tapering technique, thereby to define two interferometer arms of substantially equal length between said optical couplings where the length of said arms is less than 25 mm,
   (d) providing means for injecting an optical signal into said interferometer arms via one of said optical couplings, and
   (e) coupling a transducer to at least one of said interferometer arms.

* * * * *